(12) United States Patent
Frait

(10) Patent No.: US 9,193,336 B2
(45) Date of Patent: Nov. 24, 2015

(54) SHIFT-BY-WIRE SYSTEM FOR ACTUATING A VEHICLE PARK BRAKE

(71) Applicant: FORD GLOBAL TECHNOLOGIES, LLC, Dearborn, MI (US)

(72) Inventor: Steven A. Frait, Milan, MI (US)

(73) Assignee: FORD GLOBAL TECHNOLOGIES, LLC, Dearborn, MI (US)

(*) Notice: Subject to any disclaimer, the term of this patent is extended or adjusted under 35 U.S.C. 154(b) by 164 days.

(21) Appl. No.: 13/687,132

(22) Filed: Nov. 28, 2012

(65) Prior Publication Data

US 2014/0144733 A1 May 29, 2014

(51) Int. Cl.
| | |
|---|---|
| B60T 13/58 | (2006.01) |
| B60T 1/00 | (2006.01) |
| B60T 1/06 | (2006.01) |
| B60T 13/74 | (2006.01) |
| F16D 63/00 | (2006.01) |

(52) U.S. Cl.
CPC ............... B60T 1/005 (2013.01); B60T 1/062 (2013.01); B60T 13/588 (2013.01); B60T 13/746 (2013.01); F16D 63/006 (2013.01)

(58) Field of Classification Search
CPC ........... B60T 11/10; B60T 5/00; B60T 13/02; B60T 13/10; B60T 13/586; B60T 13/588; B60T 13/748; B60T 1/005; B60T 1/062
USPC ....... 188/106 R, 3 H, 151 A; 303/6.01, 3, 11, 303/113.4, 113.5, 122.03, 15, 9; 477/125; 475/127; 192/219.4, 219.5, 83
See application file for complete search history.

(56) References Cited

U.S. PATENT DOCUMENTS

| | | | | |
|---|---|---|---|---|
| 4,076,323 A | * | 2/1978 | Kroth | B60T 13/141 303/10 |
| 4,116,296 A | * | 9/1978 | Pleier | B60T 11/103 180/273 |
| 4,256,350 A | * | 3/1981 | Hoefer | B60T 13/16 188/170 |
| 4,339,154 A | * | 7/1982 | Duttarer | B60K 41/26 192/221.1 |
| 6,428,117 B1 | * | 8/2002 | Messersmith | B60T 13/22 188/151 A |
| 6,752,234 B2 | * | 6/2004 | Raban | B60R 25/00 180/271 |
| 7,896,775 B2 | | 3/2011 | Vernacchia et al. | |
| 8,012,063 B2 | | 9/2011 | Powell et al. | |
| 8,053,691 B2 | | 11/2011 | Vernacchia et al. | |
| 8,092,330 B2 | | 1/2012 | Frait | |
| 8,157,076 B2 | | 4/2012 | Foster | |
| 2002/0088684 A1 | * | 7/2002 | Hoess | B60T 1/005 192/219.5 |
| 2007/0182242 A1 | * | 8/2007 | Inagaki | B60T 7/047 303/3 |
| 2009/0178397 A1 | * | 7/2009 | Mankame | F15B 21/045 60/329 |
| 2010/0308644 A1 | * | 12/2010 | Ishikawa | B60T 7/14 303/10 |
| 2011/0146438 A1 | | 6/2011 | Vernacchia et al. | |
| 2011/0219905 A1 | | 9/2011 | Krishnaswami et al. | |
| 2012/0131993 A1 | | 5/2012 | Deurloo et al. | |

FOREIGN PATENT DOCUMENTS

DE     102009052149     *     5/2011

* cited by examiner

*Primary Examiner* — Anna Momper
*Assistant Examiner* — San Aung
(74) *Attorney, Agent, or Firm* — James Dottavio; MacMillan, Sobanski & Todd, LLC

(57) ABSTRACT

A vehicle park-brake system includes a park brake, a solenoid; a first pressure source; a servo for disengaging the park-brake using the first pressure source, and for disengaging the park-brake using a force produced by the solenoid that actuates first and second pistons; and a second pressure source applied to the servo causing hydraulic pressure to vent from the servo, the pistons to detach mutually, and the servo to engage the park brake.

20 Claims, 2 Drawing Sheets

SHIFT-BY-WIRE SYSTEM FOR ACTUATING A VEHICLE PARK BRAKE

BACKGROUND OF THE INVENTION

1. Field of the Invention

This invention relates generally to an apparatus for engaging and disengaging a vehicle's park brake through hydraulic and electrical actuation rather than by mechanical actuation by the vehicle operator.

2. Description of the Prior Art

In an automatic transmission that employs a shift-by-wire (SBW) control Park, Reverse, Neutral and Drive ranges of the transmission are engaged and disengaged under electrical control. SWB systems have begun to replace the conventional shifter cable, which is used in automatic transmissions to control the park pawl and a hydraulic manual valve that feeds pressure to clutches that distinguishes the Neutral range from the Reverse and Drive ranges.

SBW systems generally are of two types: (i) electromechanical having redundant hardware and supplemental power, and (ii) electro-hydraulic having a redundant electromechanical path. Electro-hydraulic SBW systems allow for reduced cost, but generally do not cover unintended loss of the Park function with single point failures.

SUMMARY OF THE INVENTION

A vehicle park-brake system includes a park brake, a solenoid; a first pressure source; a servo for disengaging the park-brake using the first pressure source, and for disengaging the park-brake using a force produced by the solenoid that actuates first and second pistons; and a second pressure source applied to the servo causing hydraulic pressure to vent from the servo, the pistons to detach mutually, and the servo to engage the park brake.

The system has secondary control of park, which allows for park re-engagement, if the primary control fails to function.

The system does not permit loss of park-engagement due to a single point failure. Using a latch valve from one of the transmission clutches, allows park-engagement, if an error state occurs. The system has a decoupling feature that allows for park-engagement, if the electro-mechanical solenoid fails in the latch position.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

The invention will be more readily understood by reference to the following description, taken with the accompanying drawings, in which.

DESCRIPTION OF THE PREFERRED EMBODIMENT

Figure 1:
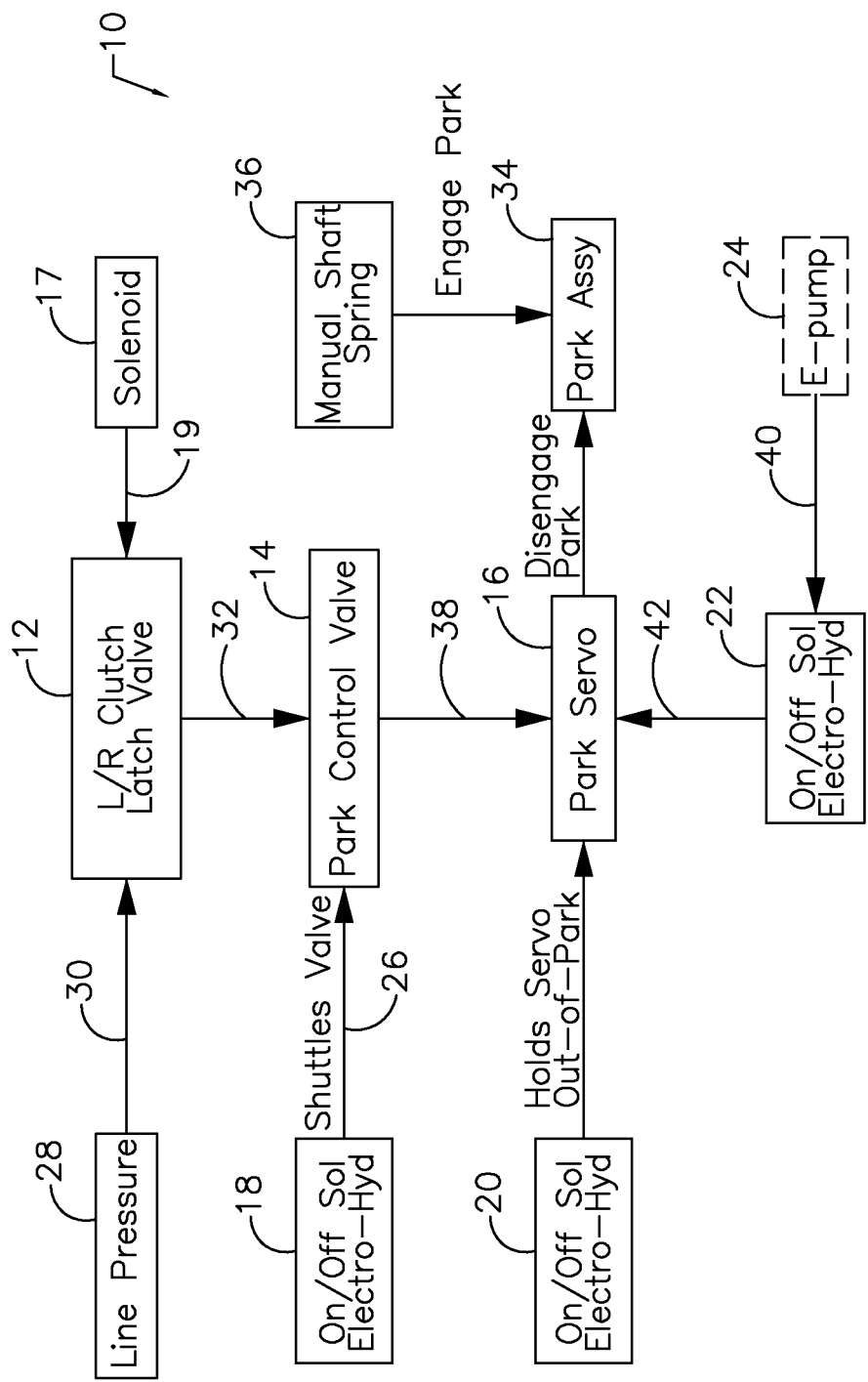
FIG. 1 is a block diagram showing the components of a shift-by-wire system that control the selection of drive ranges of an automatic transmission.

The SBW system 10 of FIG. 1 includes a latch valve 12 for a low-reverse clutch, i.e., a clutch that must be engaged hydraulically for a motor vehicle's automatic transmission to produce first gear or reverse gear; park control valve 14; park servo 16; solenoid 17; electro-hydraulic on-off solenoid 18; electro-mechanical on-off solenoid 20; and electro-hydraulic on-off solenoid 22.

Solenoid 17 opens a connection between a source of line pressure 28 and line 32 when valve 12 is latched by control pressure in line 19, i.e., when the low-reverse clutch is engaged, and closes that connection when valve 12 is unlatched. Solenoid 18 shuttles the park control valve 14 using pressure in hydraulic line 26. A source of line pressure 28 is connected through hydraulic line 30 to the latch valve 12. Latch valve 12 communicates hydraulically with park control valve 14 through hydraulic line 32.

Solenoid 20 holds the park servo 16 out of its Park position. Displacement of park servo 16 disengages a park assembly 34, against resistance force produced by a spring 36, which force urges the park assembly 34 into its park position. Park control valve 14 communicates hydraulically with park servo 16 through hydraulic line 38.

Solenoid 22 is supplied with fluid through line 40 from the outlet of an e-pump 24, which is driven by an electric motor with electric energy from the vehicle's battery 25 and supplied with fluid from a sump 41. Solenoid 22 opens and closes a hydraulic connection through hydraulic line 42 between the e-pump 24 and park servo 16.

Figure 2:
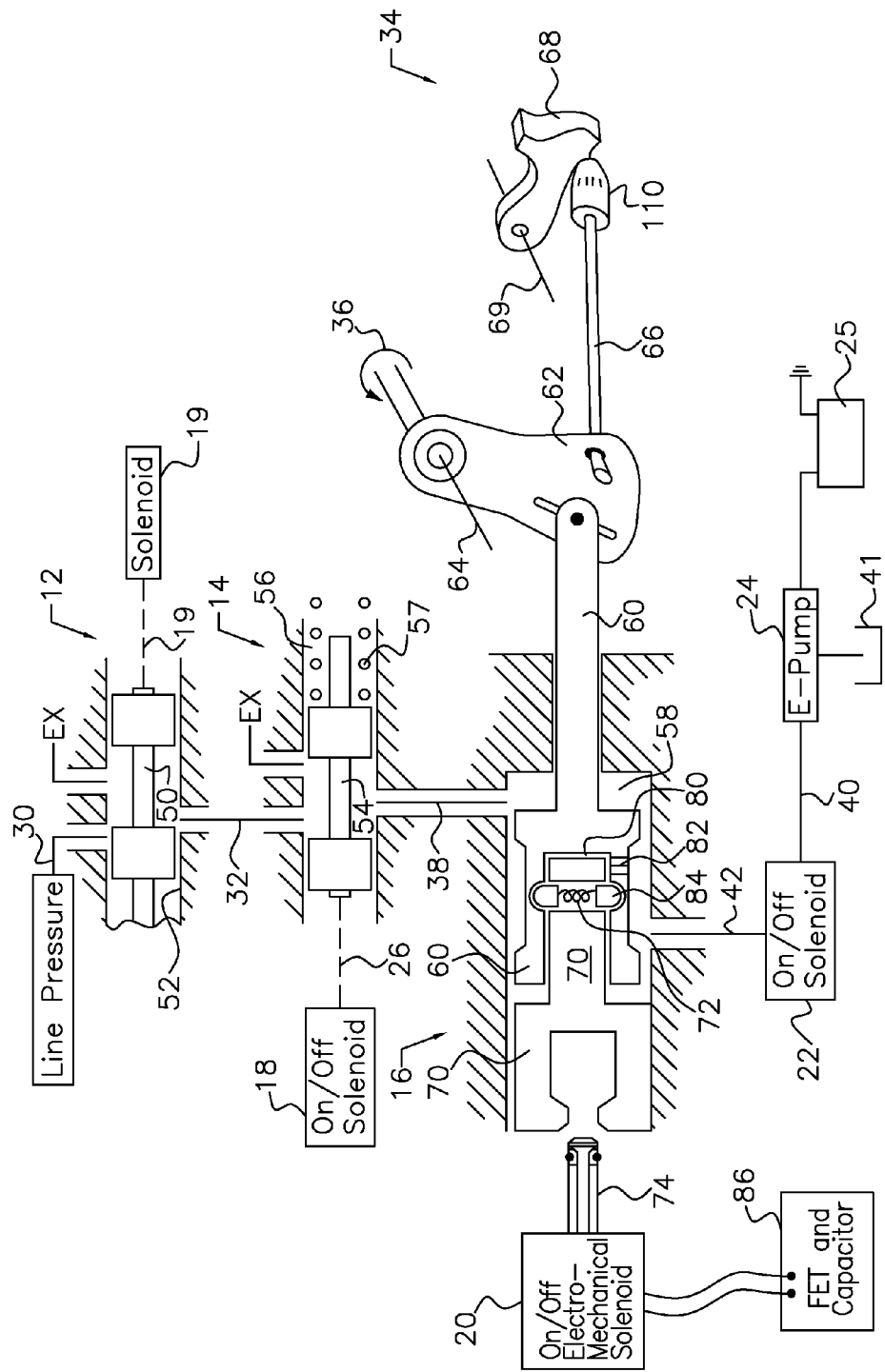
FIG. 2 is schematic diagram of the SBW system of FIG. 1.

FIG. 2 shows that latch valve 12 includes a valve spool 50, located in a cylinder bore 52; a line pressure port connected by line 30 to the source of line pressure 28; an exhaust port EX communicating with the bore; and a port connected to line 32.

Park control valve 14 includes a valve spool 54, located in a cylinder bore 56; a spring 57 urging spool 54 leftward; a port connected by line 32 to latch valve 12; an exhaust port EX communicating with cylinder bore 56; and a port connected to line 38. Solenoid 18 opens and closes control pressure supplied to cylinder bore 56 through line 26.

Park servo 16 includes a cylinder 58, a first piston 60 located in cylinder 58 and connected mechanically to a crank arm 62, whose angular position about an axis 64 is affected by torsion spring 36; an park rod 66 mechanically connected to park pawl 68, which pivots about axis 69 into and out of engagement with a parking gear (not shown); a second piston 70 located in cylinder 58 and releaseably connected by a detent 72 to the first piston 60; a port communicating line 38 to cylinder 58; and a port communicating cylinder 58 to line 42. Solenoid 20 uses an actuator 74 to engage second piston 70 and leftward away from piston 70. Engagement of pawl 68 with the parking gear locks the driven wheels and prevents movement of the vehicle.

Under normal operating conditions, when line pressure is produced, either by an engine driving a transmission pump or the battery 25 powering e-pump 24, hydraulic fluid at line pressure passes through latch valve 12 and line 32 to park control valve 14. Solenoid 18 moves park control valve 14 to a position wherein line pressure is carried in line 38 to the park servo 16. Line pressure in cylinder 58 of the park servo moves piston 60 leftward. Clockwise pivoting of crank arm 62 against the counterclockwise torque produced by torsion spring 36 causes park pawl 68 to pivot clockwise about axis 69 out of engagement with the parking gear, producing Park-disengagement.

While Park is disengaged, solenoid 20 and detent 72 hold the park servo 16 in the disengaged position. Under normal operating conditions, solenoid 20 is closed, i.e., in the Park-disengaged position, such that no power is consumed. With solenoid 20 in the closed position, the vehicle can be towed with four wheels contacting the road surface. Line pressure in cylinder 58 applies a secondary force to maintain the park servo 16 in the Park-disengaged position.

Under normal operating conditions, when solenoid 20 is electrically energized, actuator 74 releases the pistons 60, 70 allowing rightward movement, pivoting crank arm 62 counterclockwise, displacing park rod 66 rightward, and causing park pawl 68 to pivot counterclockwise into engagement with the parking gear and producing Park-engagement.

Under normal operating conditions, while the system 10 produces Park-engagement, fluid in cylinder 58 is forced through line 38 to the exhaust port of park control valve 14, as pistons 70, 60 move rightward in cylinder 58.

If solenoid 20 becomes inoperative, such as due to loss of electric power supply to solenoid 20 or failure of a component of the solenoid, the system returns to Park-engagement as hydraulic pressure, produced by e-pump 24, pressurizes cylinder 58 through solenoid 22 and line 42. That pressure is present also in the space 80 between the pistons 60, 70 due to radial passage 82. Space 80 is retained by dent balls 84 and spring 72. Pressure in space 80 detaches piston 60 from piston 70. Pressure in cylinder 58 is vented though line 38 and the exhaust port EX of park control valve 14. Spring 36 pivots crank arm 62 clockwise and park pawl clockwise into engagement with the parking gear, thereby engaging Park.

Solenoid 20 may be electrically energized by a charged capacitor through a FET at 86.

In accordance with the provisions of the patent statutes, the preferred embodiment has been described. However, it should be noted that the alternate embodiments can be practiced otherwise than as specifically illustrated and described.

The invention claimed is:

1. A vehicle park-brake system, comprising:
a park brake;
a solenoid;
a first hydraulic pressure source;
a servo for disengaging the park-brake using the first hydraulic pressure source and disengaging the park-brake using a mechanical force produced by the solenoid that actuates first and second pistons, the solenoid selectively mechanically contacting one of the pistons;
a second hydraulic pressure source applied to the servo causing hydraulic pressure to vent from the servo, the pistons to detach mutually, and the servo to engage the park brake.

2. The vehicle park-brake system of claim 1, further comprising:
a second solenoid;
a valve operated by the second solenoid for opening and closing a connection between the first hydraulic pressure source and the servo.

3. The vehicle park-brake system of claim 2, further comprising:
a third solenoid;
a latch valve operated by the third solenoid for opening and closing a connection between the first hydraulic pressure source and the servo through the valve.

4. The vehicle park-brake system of claim 1, further comprising:
a second solenoid;
a valve operated by the second solenoid for opening and closing a connection between the first hydraulic pressure source and the servo, and including an exhaust port through which hydraulic pressure vents from the servo.

5. The vehicle park-brake system of claim 1, wherein the second hydraulic pressure source comprises:
an electric storage battery;
an electric motor powered by the battery;
a pump connected to a fluid source and driven by the electric motor; and
a second solenoid for opening and closing a connection between an outlet of the pump and the servo.

6. The vehicle park-brake system of claim 1, wherein the mechanical force that actuates the first and second pistons tending to disengage the park brake is produced by the solenoid without electric current being supplied to the solenoid.

7. The vehicle park-brake system of claim 1, further comprising:
a crank arm secured to one of the pistons;
a park pawl secured to the crank arm;
a spring urging the crank arm to pivot toward engagement of the park brake.

8. A vehicle park-brake system, comprising:
a park brake;
an electronically controlled solenoid;
a servo including first and second releaseably connected pistons displaceable in a cylinder, the first piston secured to the park brake, the second piston releaseably mechanically connected to the solenoid;
a first hydraulic pressure source connected to the servo for moving the pistons in a first direction to disengage the park-brake;
a second hydraulic pressure source connected to the cylinder at a different location from the first hydraulic pressure source for causing hydraulic pressure to vent the cylinder, the first and second pistons to detach mutually, and the first piston to move in a second direction to engage the park brake.

9. The vehicle park-brake system of claim 8, further comprising:
a second solenoid;
a valve operated by the second solenoid for opening and closing a connection between the first hydraulic pressure source and the cylinder.

10. The vehicle park-brake system of claim 9, further comprising:
a third solenoid;
a latch valve operated by the third solenoid for opening and closing a connection between the first hydraulic pressure source and the cylinder through the valve.

11. The vehicle park-brake system of claim 8, further comprising:
a second solenoid;
a valve operated by the second solenoid for opening and closing a connection between the first hydraulic pressure source and the cylinder, and including an exhaust port through which hydraulic pressure vents from the cylinder.

12. The vehicle park-brake system of claim 8, wherein the second hydraulic pressure source comprises:
an electric storage battery;
an electric motor powered by the battery;
a pump connected to a fluid source and driven by the electric motor; and
a second solenoid for opening and closing a connection between an outlet of the pump and the cylinder.

13. The vehicle park-brake system of claim 8, wherein a mechanical force produced by the solenoid on the second piston that actuates the first and second pistons tending to disengage the park brake is produced by the solenoid without electric current being supplied to the solenoid.

14. The vehicle park-brake system of claim 8, further comprising:
- a crank arm secured to the first piston;
- a park pawl secured to the crank arm;
- a spring urging the crank arm to pivot toward engagement of the park brake.

15. A vehicle park-brake system, comprising:
- a park brake;
- a solenoid;
- a low-reverse gear latch valve operated by a second solenoid for opening and closing a connection to a first hydraulic pressure source;
- a valve operated by a third solenoid for opening and closing a connection to the first hydraulic pressure source through the latch valve;
- a servo for disengaging the park-brake using the first hydraulic pressure source, and for disengage the park-brake using a force produced by the solenoid that actuates first and second pistons;
- a second hydraulic pressure source applied to the servo causing hydraulic pressure to vent from the servo, the pistons to detach mutually, and the servo to engage the park brake.

16. The vehicle park-brake system of claim 15, further comprising:
- the second valve for opening and closing a connection between the first hydraulic pressure source and the servo including an exhaust port through which hydraulic pressure vents from the servo.

17. The vehicle park-brake system of claim 15, wherein the second hydraulic pressure source comprises:
- an electric storage battery;
- an electric motor powered by the battery;
- a pump connected to a fluid source and driven by the electric motor; and
- a fourth solenoid for opening and closing a connection between an outlet of the pump and the servo.

18. The vehicle park-brake system of claim 15, further comprising:
- a crank arm secured to one of the pistons;
- a park pawl secured to the crank arm;
- a spring urging the crank arm to pivot toward engagement of the park brake.

19. The vehicle park-brake system of claim 3 wherein the latch valve is a low-reverse gear clutch latch valve.

20. The vehicle park-brake system of claim 10 wherein the latch valve is a low-reverse gear clutch latch valve.

* * * * *